United States Patent
Wada

(10) Patent No.: US 7,379,665 B2
(45) Date of Patent: May 27, 2008

(54) DRIVING DEVICE AND LIGHT-AMOUNT ADJUSTING DEVICE PROVIDED WITH THE SAME

(75) Inventor: Hiroyuki Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 10/942,641

(22) Filed: Sep. 16, 2004

(65) Prior Publication Data

US 2005/0063031 A1 Mar. 24, 2005

(30) Foreign Application Priority Data

Sep. 19, 2003 (JP) .............................. 2003-328155

(51) Int. Cl.
*G03B 7/10* (2006.01)
*G03B 7/26* (2006.01)
*H02P 8/00* (2006.01)

(52) U.S. Cl. .................... 396/260; 396/280; 318/696

(58) Field of Classification Search ................ 396/244, 396/256, 260, 280; 318/696, 626, 685
See application file for complete search history.

(56) References Cited

U.S. PATENT DOCUMENTS 5,572,270 A * 11/1996 Yamamoto et al. ......... 396/133

FOREIGN PATENT DOCUMENTS

| JP | S62-193530 | 8/1987 |
|----|------------|--------|
| JP | H07-308098 | 11/1995 |

* cited by examiner

Primary Examiner—W. B. Perkey
(74) Attorney, Agent, or Firm—Cowan, Liebowitz & Latman, P.C.

(57) ABSTRACT

A driving device includes a stepping motor for causing the light-amount adjusting member to open and close so as to adjust an amount of light passing through an optical system. A driving range where the light-amount adjusting member is actually used for effecting light amount adjustment is set to a range exceeding an electrical angle 360° of the stepping motor. A mechanical abutment portion is provided at a position outside the driving range, and a portion of the light-amount adjusting member is brought into abutment with the mechanical abutment portion when an initial reset of the stepping motor is performed. The light-amount adjusting member is brought to a position a predetermined distance away from the mechanical abutment portion when a light-amount adjusting function of the light-amount adjusting member is stopped.

12 Claims, 4 Drawing Sheets

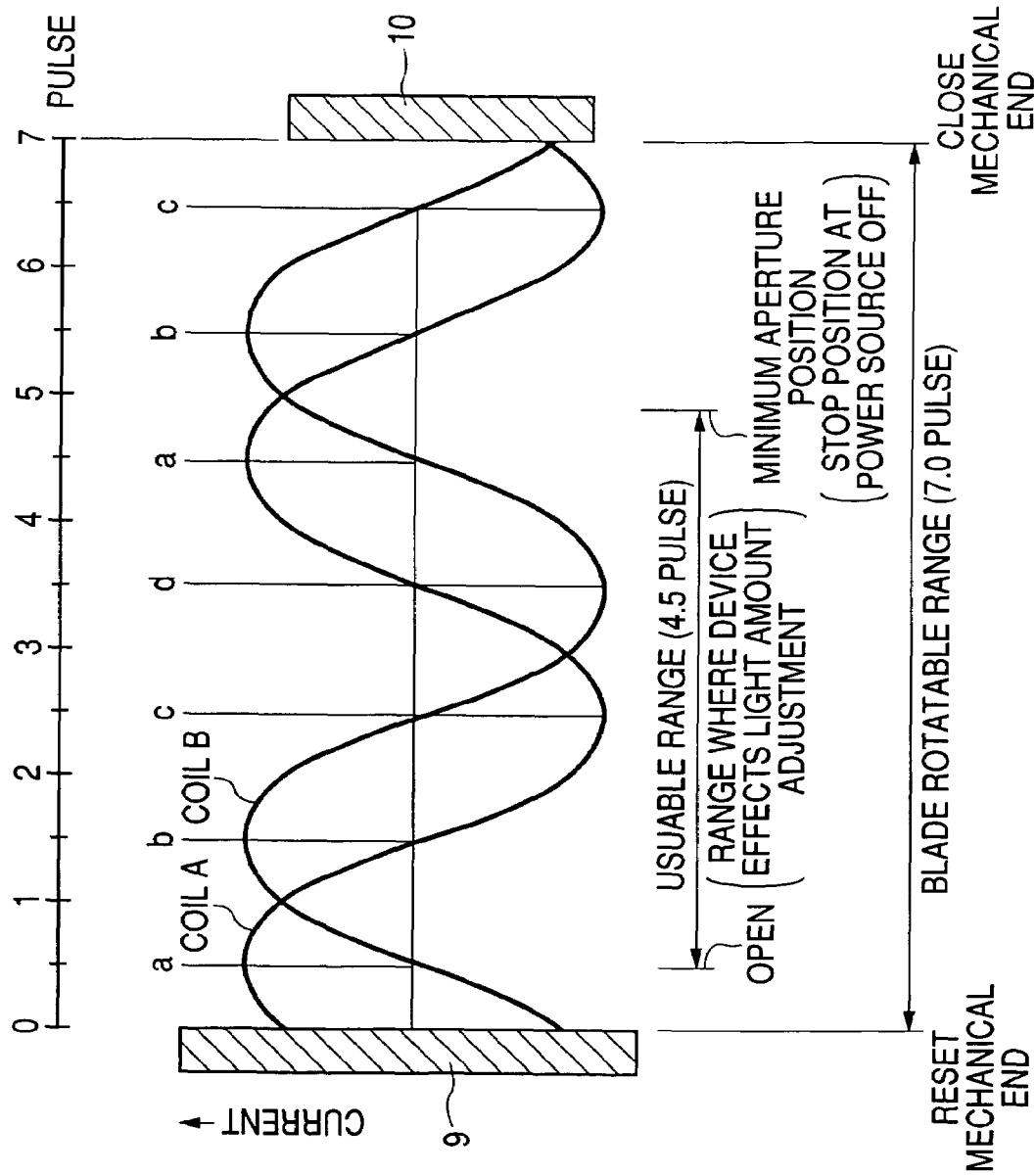

DRIVING DEVICE AND LIGHT-AMOUNT ADJUSTING DEVICE PROVIDED WITH THE SAME

BACKGROUND OF THE INVENTION

1. Field of the Invention

The present invention relates to a driving device provided with a stepping motor as a drive source, a light-amount adjusting device such as a diaphragm device that uses the driving device, and a camera provided with the light-amount adjusting device.

2. Related Background Art

Known light-amount adjusting devices, which are used for video cameras and the like, include: an actuator of a galvano-system that causes two diaphragm blades to perform opening/closing operation according to an amount of current applied to a drive coil; a Hall element for detecting a diaphragm position; and a circuit that outputs a control signal of the diaphragm position. However, this system has the following disadvantages: 1) it has a complicated structure due to its large number of parts such as a sensor for position detection (Hall element), a circuit therefor, and a control circuit; 2) it is necessary to lower the resistance value of the drive coil in order to add a shutter function, which leads to a reduction in power consumption for the diaphragm operation. In view of this, a diaphragm device using a stepping motor has been proposed.

For example, Japanese Patent Application Laid-Open No. H07-111617 discloses a diaphragm device that uses a stepping motor, and a reset sensor is provided at a full close position of the diaphragm. When the power source is turned OFF, blades of the diaphragm are moved further toward the close side and stopped. Accordingly, when the power source is turned ON at the next time, the blades are moved toward the open side, making it possible to positively perform reset detection in a short period of time. Further, means for judging whether the blades are at a position closer to the close side than the reset sensor, or closer to the open side is provided to determine which direction the blades should be moved when a reset operation is performed. Accordingly, the reset operation is performed positively in a short period of time.

Further, in the diaphragm device disclosed in Japanese Patent Application Laid-Open No. 2002-107792, diaphragm blades are driven by using a stepping motor, and an initial reference position is determined through mechanical abutment. With respect to rotation of the rotor, a mechanical angle is set so as to fall within one rotation of an electrical angle. Accordingly, it is possible to dispense with a reset sensor and to positively detect the blade position.

However, the diaphragm device disclosed in Japanese Patent Application Laid-Open No. 2002-107792 involves such a disadvantage that the mechanical angle is limited by the electrical angle, which increases movement of the blades per step. As a result, it is impossible to perform a minute operation of the diaphragm device. On the other hand, if the mechanical angle is made larger so as to fall within a range that is not limited by the electrical angle, a reset operation is necessary. Accordingly, in order to positively find an amount of its diaphragm without providing the reset sensor, one possible method is to bring a drive unit into abutment with one of the mechanical ends such as stoppers, and to find the amount of its diaphragm by using as the reset position the position of the mechanical ends.

However, if the reset operation is performed through mechanical abutment as described above, no means that uses an electrical signal or the like is provided for checking whether or not the reset operation is performed. Accordingly, a stroke larger than a full stroke between the closed position and the opened position is driven to bring the blades into abutment with the mechanical end to determine that the position where the blades are stopped is the reset position. With this structure, not only does an impact at the time of abutment causes an unpleasant noise, but also damages are caused to the diaphragm device by repetitive reset operations, and that may affect the function thereof.

If the blades are stopped in the vicinity of the reset position when the power source is turned OFF or the like as in the diaphragm device disclosed in Japanese Patent Application Laid-Open No. H07-111617 above, and if the reset operation is performed through mechanical abutment as in the diaphragm device disclosed in Japanese Patent Application Laid-Open No. 2002-107792, a time period increases where the blades are meaninglessly driven while being in abutment with the mechanical end when the reset operation is performed, causing the above unpleasant noise for a longer period of time, and also causing damage to the function.

SUMMARY OF THE INVENTION

The present invention is made in view of the above problems, and it is an object of the present invention to provide a device in which it is possible to suppress an impact noise that is caused by a portion of a light-amount adjusting member being brought into abutment with a mechanical abutment portion when a reset operation is performed, and to prevent damage caused by repetitive abutments.

To solve the above problems, a driving device according to the present invention includes: a stepping motor adapted to drive a member to be driven, a driving range of the member to be driven being set to a range exceeding an electrical angle 360° of the stepping motor; a mechanical abutment portion with which a portion of the member to be driven is brought into abutment at a time when an initial reset of the stepping motor is performed; and a control circuit adapted to bring the member to be driven to a position a predetermined distance away from the mechanical abutment portion at a time when the member to be driven is stopped, which is followed by the initial reset that is performed for a next drive.

Further, to solve the above problems, a light-amount adjusting device according to the present invention includes: a light-amount adjusting member; a stepping motor adapted to cause the light-amount adjusting member to open and close via a drive force transmitting portion so as to adjust an amount of light passing through an optical system, a driving range where the light-amount adjusting member is actually used for effecting light amount adjustment being set to a range exceeding an electrical angle 360° of the stepping motor; a mechanical abutment portion with which a portion of the light-amount adjusting member is brought into abutment at a time when an initial reset of the stepping motor is performed, the mechanical abutment portion being provided at a position outside the driving range where the light-amount adjusting member is actually used for effecting light amount adjustment; and a control circuit adapted to bring the light-amount adjusting member to a position a predetermined distance away from the mechanical abutment portion at a time when a light-amount adjusting function of the light-amount adjusting member is stopped.

Other features and advantages of the present invention will be apparent from the following description taken in

BRIEF DESCRIPTION OF THE DRAWINGS

FIG. 2 shows waveforms of currents supplied to coils that are structural components of the stepping motor shown in FIGS. 1A, 1B, 1C, and 1D;

DESCRIPTION OF THE PREFERRED EMBODIMENTS

Hereinafter, preferred embodiments of the present invention will be described with reference to the drawings.

First Embodiment

Figure 5:
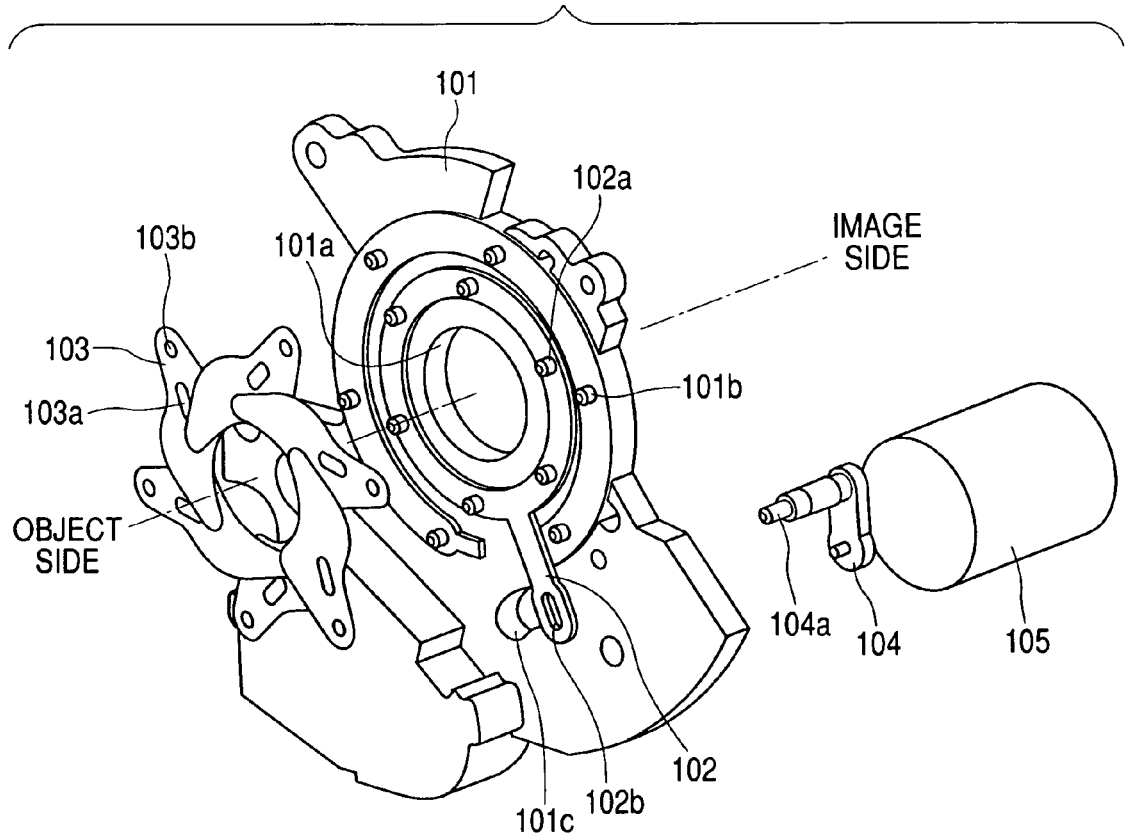
FIG. 5 shows a configuration of the diaphragm device according to the first embodiment of the present invention.

FIG. 5 shows a configuration of a diaphragm device as a light-amount adjusting device according to a first embodiment of the present invention. In FIG. 5, reference numeral 101 denotes a base plate serving as a base of the diaphragm device. An opening 101a is formed at a central portion of the base plate 101. Reference numeral 102 denotes a windmill ring for allowing six diaphragm blades (described below) to perform opening/closing operation. The windmill ring 102 is attached to an object side surface of the base plate 101 around the opening 101a so as to be capable of rotating about an optical axis.

Reference numeral 103 denotes six diaphragm blades. A hole portion 103b and an elongated hole portion 103a are formed in each of the diaphragm blades 103. Fixing shaft portions 101b provided at six locations in a circumferential direction of the base plated 101 are each fitted into the hole portion 103b, and drive shaft portions 102a provided at six locations in a circumferential direction of the windmill ring 102 are each fitted into the elongated hole portion 103a.

Further, an elongated hole portion 102b is formed at an edge of an arm portion that is provided at one location in the circumferential direction of the windmill ring 102. A drive shaft portion 104a of a diaphragm drive lever 104 is engaged with the elongated hole portion 102b so as to extend from an image side of the base plate 101 to the object side through an arcuate hole portion 101c formed in the base plate 101.

The diaphragm drive lever 104 is connected to an output shaft of a stepping motor 105. When the stepping motor 105 is rotated to cause the diaphragm drive lever 104 to rotate, the windmill ring 102 rotates and a rotational force of the windmill ring 102 is transmitted to the six diaphragm blades 103 via the drive shaft portions 102a. The six diaphragm blades 103 thus respectively rotate about the fixing shaft portions 101b, changing the diameter of an aperture formed by the six diaphragm blades 103 to effect light amount adjustment.

FIGS. 1A to 1D are schematic views showing a stepping motor for driving the blades in the diaphragm device according to the present invention, a control circuit for the stepping motor, and an operation of the stepping motor.

In FIGS. 1A to 1D, reference numeral 1 denotes a cylindrical rotor magnet that is magnetized with four poles on its outer peripheral surface; 2, a rotation shaft fixed to the rotor magnet 1; and 3, a lever serving as a drive force transmitting portion. The lever 3 is fixed to the rotation shaft 2 and makes a revolution together with the rotor magnet 1. Reference numeral 4 denotes a stator serving as a magnetic pole of one of electromagnets; 5, an exciting coil A (hereinafter referred to as A-exciting coil 5) for exciting the stator 4 to generate a magnetic force; 6, a stator serving as a magnetic pole of the other of the electromagnets; and 7, an exciting coil B (hereinafter referred to as B-exciting coil 7) for exciting the stator 6 to generate a magnetic force. Reference numeral 8 denotes a control circuit for controlling the supply of current to the A-exciting coil 5 and B-exciting coil 7. The lever 3 corresponds to the diaphragm drive lever 104 in FIG. 5.

The two electromagnets are disposed so as to have a phase difference of 90° in an electrical angle. That is, the two electromagnets constitute a two-phase PM stepping motor, in which the rotor magnet 1 rotates in synchronization with a rotation magnetic field generated by supplying alternate currents having a phase difference of 90° in an electrical angle to the A-exciting coil 5 and the B-exciting coil 7.

Figure 1A:
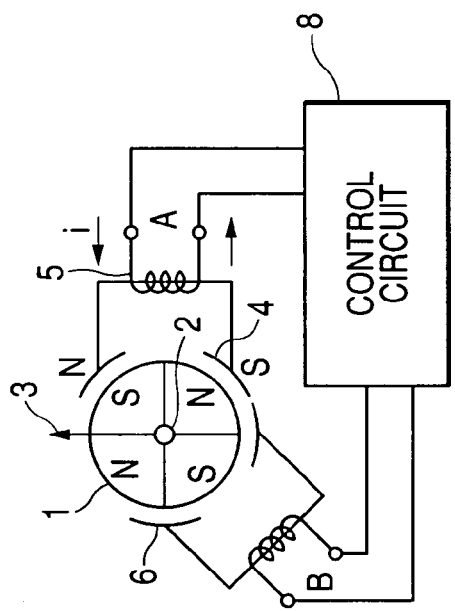
FIGS. 1A, 1B, 1C, and 1D are schematic views showing a stepping motor for driving blades in a diaphragm device according to a first embodiment of the present invention, a control circuit for the stepping motor, and an operation of the stepping motor.
Figure 1D:
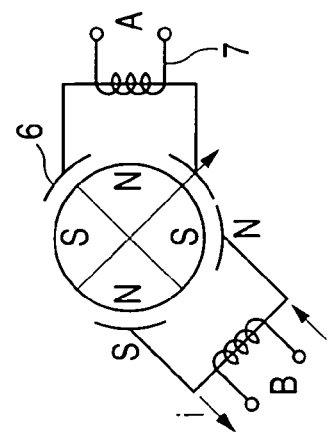

In FIG. 1A, an electrical current i is supplied to the A-exciting coil 5 in a direction indicated by an arrow to excite the stator 4 as shown in the drawing. Then, the rotor magnet 1 stops at a position where it is magnetically balanced. Next, an electrical current i is supplied to the B-exciting coil 7 in a direction indicated by an arrow in FIG. 1B, and the electrical current i flowing through the A-exciting coil 5 is stopped. Then, the stator 6 is excited as shown in FIG. 1B, and the rotor magnet 1 rotates into a position where it is magnetically balanced.

Figure 1C:
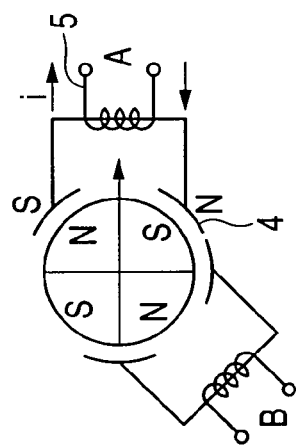
Figure 1B:
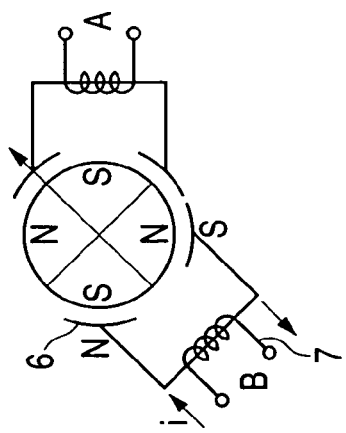

Next, an electrical current i is supplied to the A-exciting coil 5 in a direction indicated by an arrow in FIG. 1C, and the electrical current i flowing through the B-exciting coil 7 is stopped. Then, the stator 4 is excited as shown in FIG. 1C, and the rotor magnet 1 rotates into a position where it is magnetically balanced. Further, an electrical current i is supplied to the B-exciting coil 7 in a direction indicated by an arrow in FIG. 1D, and the electrical current i flowing through the A-exciting coil 5 is stopped. Then the stator 6 is excited as shown in FIG. 1D, and the rotor magnet 1 rotates to a position where it is magnetically balanced. The rotor magnet 1 continues its rotation by setting the value of electrical currents supplied to the A-exciting coil 5 and the B-exciting coil 7 as shown in FIGS. 1A to 1D.

The lever 3 is engaged with diaphragm blades as an example of a light-amount adjusting member (not shown). The diaphragm blades are driven from an open aperture to a minimum aperture according to the rotation of the lever 3.

If a mechanical angle is set within 2×360°/P (where P is 4 poles here) as disclosed in Japanese Patent Application Laid-Open No. 2002-107792 described above, the phase of the rotor magnet 1 in a rotational direction is determined exclusively by the state of the electrical currents supplied to the A-exciting coil 5 and the B-exciting coil 7. However, in this embodiment, the mechanical angle is set to not less than 2×360°/p (180°) so as to make the movement of the blades per pulse smaller. That is, as shown in FIG. 2, a large mechanical blade rotatable range is given, and mechanical stoppers 9 and 10 for restricting the blade rotatable range are provided at mechanical ends on an open side and a close side, respectively. Note that FIG. 2 shows the state of the electrical currents supplied to the A-exciting coil 5 and the B-exciting coil 7, where the vertical axis represents the amount of current and the horizontal axis represents the rotational phase of the rotor magnet 1.

In the configuration shown in FIG. 1, the rotational angle of the rotor magnet 1 per pulse is 45°, and therefore the rotational angle from the mechanical end on the open side (the mechanical stopper 9) to the mechanical end on the close side (the mechanical stopper 10) in FIG. 2 is 315° (45°×7 steps).

FIGS. 1A to 1D show an example where the stepping motor is driven by using a driving method of single-phase excitation. However, it is possible to drive the blades in a finer resolution if the stepping motor is driven by using a driving method of so-called 1-2 phase excitation that further provides a phase in which electrical currents are supplied simultaneously to the A-exciting coil 5 and the B-exciting coil 7. The blades can also be driven in a finer resolution if the stepping motor is driven by a micro-step drive.

In FIG. 2, the blades can be rotated in a range from a reset mechanical end to the mechanical end on the close side (close mechanical end). In camera products such as digital cameras and video cameras, a range used for an operation of actually determining the aperture diameter is smaller than the above range. In FIG. 2, it is assumed that the blade rotatable range is for 7.0 pulses (315°), and a usable range (a range where the device effects light amount adjustment) is for 4.5 pulses in the following explanation. The present invention is of course not limited to this structure. Note that as shown in FIG. 2, the usable range of the blades is set to a range exceeding an electrical angle 360° of the stepping motor. This is because, needless to say, a reset operation is assumed to be necessary. (In a system where the blades are used within a range of 360° in an electrical angle, no reset operation is necessary because the aperture value (an angle of the lever 3) is determined exclusively by an excitation position of the stepping motor.) The mechanical end of the blades on the open side is set to a position away from an open aperture position toward the open side by 0.5 pulses. The mechanical end on the close side is set to a position away from a minimum aperture position toward the minimum aperture side by 2.0 pulses.

Here, it is assumed that an initial positional reset is performed by bringing the blades into abutment with the mechanical end on the open side (the reset mechanical end, which is a mechanical abutment portion on the left side in FIG. 2). In order to perform a reset operation (an operation for driving the blades from the minimum aperture position to the open aperture position when a power source is turned ON), it is necessary to drive the blades for the number of steps not less than the blade rotational range, that is, for at least 7.0 pulses. In digital cameras or other such cameras, no memory is normally stored as to the conditions when the power source is turned OFF or the like. Therefore, it is necessary to drive the blades for the number of steps not less than the blade usable range in order to perform a reset operation (an operation for bringing the blades into abutment with a mechanical end) no matter where the blades may be positioned.

In this embodiment, the stepping motor is not turned OFF as it is when the power source is turned OFF, which is followed by an initial positional reset required for the next drive. Instead, the blades are driven to a position in the vicinity of the minimum aperture position and stopped before the stepping motor is turned OFF.

Figure 3:
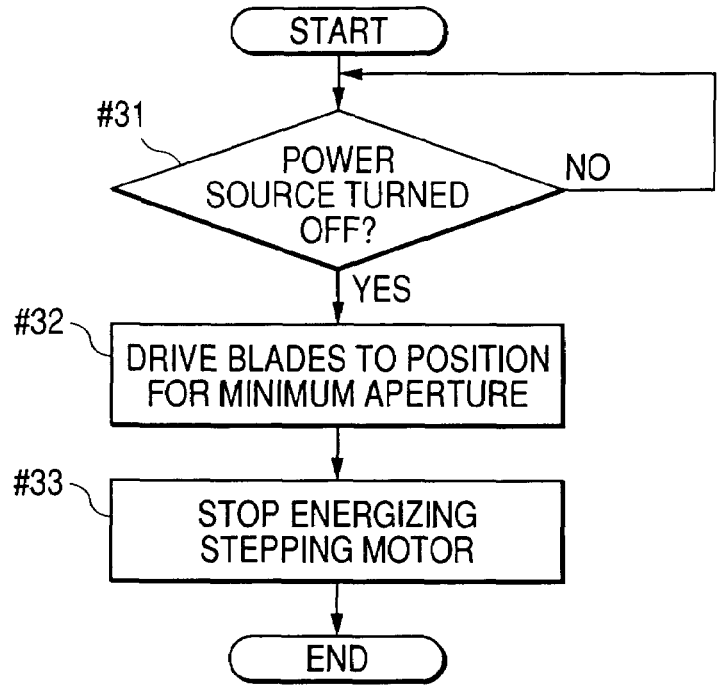
FIG. 3 is a flow chart showing an operation of a main portion according to the first embodiment of the present invention.

FIG. 3 is a flow chart showing this operation, which is performed by the control circuit 8 in FIG. 1.

In FIG. 3, when a power source of a camera is ON, normally, it is judged at predetermined timer intervals whether or not the power source is turned OFF (#31). When it is judged that the power source of the camera is turned OFF, the blades are driven to the minimum aperture position (pulse position for 5.0 in FIG. 2) (#32). Then, the power supply to the stepping motor is turned OFF (#33).

Assume, for example, that the number of steps for the reset operation is set to 8.0 pulses. If the blades are located at the open aperture position when the power source of the camera is turned OFF, the blades will be driven for extra 7.5 pulses after being brought into abutment with the reset mechanical end when the power source of the camera is turned ON the next time. Similarly, if the blades are located at a middle aperture position (a pulse position for 2.5 in FIG. 2) when the power source of the camera is turned OFF, the blades will be driven for extra 5.5 pulses after being brought into abutment with the reset mechanical end when the power source of the camera is turned ON the next time.

On the other hand, if the blades are always driven to the minimum aperture position and stopped when the power source is turned OFF as in the first embodiment, it is possible to minimize the number of extra pulses for abutment to 3.0 pulses. The blade stopping position is not limited to the minimum aperture position. The closer the blade stopping position is to the minimum aperture position, the smaller the number of extra pulses for abutment becomes. The effect of the present invention can be fully achieved by setting the blade stopping position at least away from a middle position of the usable range (a driving range where the device effects light amount adjustment) toward the minimum aperture side.

As described above, the number of the driving pulses for the resetting operation, the number of the steps from the mechanical ends to the usable range, the number of the poles of the stepping motor, and the like are not limited to the numeral values used in the first embodiment. The effect can be obtained as long as the blade stopping position is located away from the middle position of the usable range. Further, the mechanical end on the close side may be assumed to be the reset mechanical end, and the blades may be stopped at the open aperture position (the pulse position for 0.5 in FIG. 2) or in the vicinity thereof when the power source is turned OFF.

Further, in the first embodiment, the description is made of the blade stopping position when the power source is turned OFF. However, the present invention is applicable to all the cases where the power supply to the stepping motor is turned OFF when lenses are no longer used due to mode switching of the camera and the like. Examples of the mode switching are switching from a camera photographing mode to a camera image reproduction mode, a switching from an optical finder using mode to an electrical finder using mode in the camera photographing mode, and the like.

Second Embodiment

Figure 4:
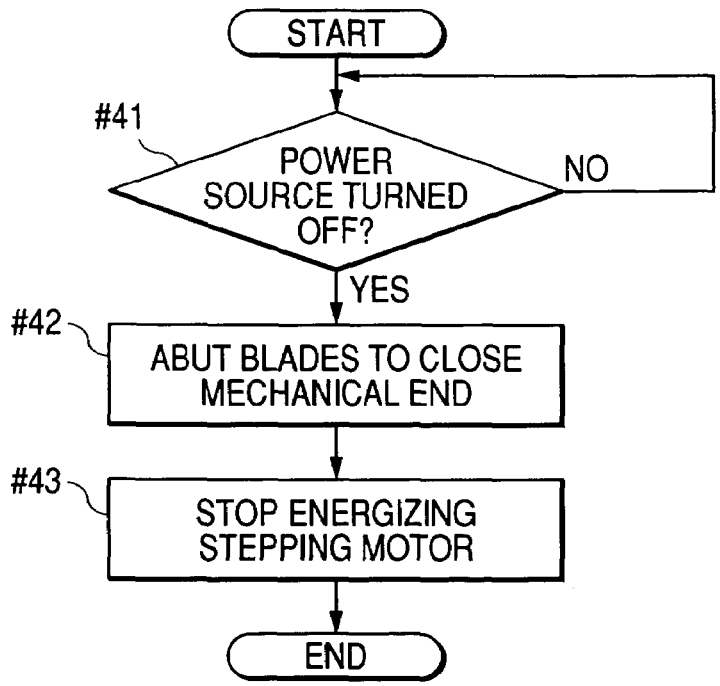
FIG. 4 is a flow chart showing an operation of a main portion according to a second embodiment of the present invention.

Referring to FIG. 2, which is used for the description of the first embodiment, and using a flow chart in FIG. 4, a second embodiment of the present invention will be described.

In the first embodiment, the blades are stopped at the minimum aperture position, which is the end portion of the usable range as a camera, when the power source is turned OFF. However, in the second embodiment, it is assumed that the blades are stopped at the end portion of the blade rotatable range (at the close mechanical end). FIG. 4 is a flow chart showing this operation. In FIG. 4, first, it is judged whether or not the power source of the camera is turned OFF (#41). If it is judged that the power source is turned OFF, the blades are driven to the close mechanical end (the pulse position for 7.0 in FIG. 2) (#42). At this time, the blades are driven for some more pulses after being brought into abutment with the close mechanical end, thereby reliably bringing the blades into abutment with the close mechanical end. In this way, it is possible to reliably perform the reset operation when the power source is turned ON the next time even if the stepping motor steps out for some reason or other. Thereafter the power supply to the stepping motor is turned OFF (#43).

Similarly to the first embodiment, it is assumed that the number of steps for the reset operation is set to 8.0 pulses. Then, because the blades are stopped at the end portion of the blade rotatable range (at the close mechanical end) in the second embodiment, the number of extra pulses for the abutment at the mechanical end on the open side when the power source is turned ON and the reset operation is performed is 1.0, which is smaller than the number thereof in the first embodiment.

Further, it is possible to prevent a malfunction in positional control due to stepping out of the stepping motor.

Note that similarly to the first embodiment, the number of the driving pulses for the reset operation, the number of the steps from the mechanical ends to the usable range, the number of the poles of the stepping motor, and the like are not limited to the numeral values used in the second embodiment. Further, the mechanical end on the close side may be assumed to be the reset mechanical end, and the blades may be stopped at the mechanical end on the open side (the pulse position for 0.0 in FIG. 2) when the power source is turned OFF.

Further, in the second embodiment, similarly to the first embodiment, it is when the power source is turned OFF that the blades are stopped at the position in the vicinity of the minimum aperture position. However, the present invention is applicable to all the cases where the power supply to the stepping motor is turned OFF when lenses are no longer used due to mode switching of the camera and the like.

According to the first and second embodiments of the present invention, the blades are stopped at a position some distance away from the reset mechanical end when the power source is turned OFF. More specifically, if the mechanical end on the open side is assumed to be the reset mechanical end, the blade stopping position is set to the position at least away from the middle position of the usable range toward the minimum aperture side. Accordingly, the noise due to the reset operation when the power source is turned ON can be reduced, and damage to a blade driving mechanism can be prevented.

Further, when the power source is turned OFF, the blades are driven for some more pulses after being brought into abutment with the close mechanical end, making it possible to reliably perform the reset operation even if the stepping motor steps out. Thus, the position of the blades can be reliably detected.

Further, in the first and second embodiments, description is made of the diaphragm device as an example. However, the present invention is also applicable to the shutter device for driving shutter blades.

Further, the present invention is applicable not only to the blades but also to other such light-amount adjusting members that are capable of performing opening/closing operation. The light-amount adjusting members include an ND filter. In this case, an open state indicates a state where the ND filter is removed from an optical path, and a close state indicates a state where the ND filter is placed in the optical path.

Further, the similar effects can be obtained by adopting the following construction in order to prevent stepping out of the stepping motor: when the initial reset is performed, the stepping motor may be driven further in the same direction for a predetermined number of steps after a portion of the light-amount adjusting member is brought into abutment with the mechanical abutment portion.

The present invention is applicable to the light-amount adjusting device that has such a structure that when the reset operation is performed, a portion of the light-amount adjusting member is brought into abutment with the mechanical abutment portion; and to an optical device (a focus adjusting device and the like) that is provided with the light-amount adjusting device.

The present invention can be applied to system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2003-328155 filed Sep. 19, 2003, which is hereby incorporated by reference herein.

What is claimed is:

1. A driving device, comprising:
   a stepping motor adapted to drive a member to be driven;
   a mechanical abutment portion with which a portion of the member to be driven is brought into abutment at a time when an initial reset of the stepping motor is performed; and
   a control circuit adapted to stop the member to be driven to a position nearer one end portion of a driving range in which the driving device effects predetermined operation, than an intermediate position in the driving range at a time when a power source for the driving device is turned OFF, which is followed by the initial reset that is performed for a next drive.

2. A driving device according to claim 1, further comprising a second mechanical abutment portion at a position different from the mechanical abutment portion used for performing the initial reset,
   wherein the control circuit causes the portion of the member to be driven to come into abutment with the second mechanical abutment portion at the time when the power source for the driving device is turned OFF, which is followed by the initial reset that is performed for a next drive.

3. A driving device according to claim 2, wherein the control circuit drives the stepping motor further in a same direction for a predetermined number of steps after causing the part of the member to be driven to come into abutment with the second mechanical abutment portion at the time when the power source for the driving device is turned OFF.

4. A driving device according to claim 1, wherein the control circuit drives the stepping motor further in a same direction for a predetermined number of steps after causing the part of the member to be driven to come into abutment with the second mechanical abutment portion at the time when the initial reset is performed.

5. A light-amount adjusting device, comprising:
a light-amount adjusting member;
a stepping motor adapted to cause the light-amount adjusting member to open and close via a drive force transmitting portion so as to adjust an amount of light passing through an optical system;
a mechanical abutment portion with which a portion of the light-amount adjusting member is brought into abutment at a time when an initial reset of the stepping motor is performed, the mechanical abutment portion being provided at a position outside the driving range where the light-amount adjusting member is actually used for effecting light amount adjustment; and
a control circuit adapted to stop the light-amount adjusting member to a position nearer a minimum aperture side than an intermediate position within a driving range where the light-amount adjusting member acts to adjusting light-amount at a time when a power source of the light-amount adjusting member is turned OFF.

6. A light-amount adjusting device according to claim 5, further comprising a second mechanical abutment portion at a position opposite to the mechanical abutment portion used for performing the initial reset and outside the driving range of the light-amount adjusting member,
wherein the control circuit causes the portion of the light-amount adjusting member to come into abutment with the second mechanical abutment portion at the time when the power source of the light-amount adjusting member is turned OFF.

7. A light-amount adjusting device according to claim 6, wherein the control circuit drives the stepping motor further in a same direction for a predetermined number of steps after causing the part of the light-amount adjusting member to come into abutment with the second mechanical abutment portion at the time when the power source of the light-amount adjusting member is turned OFF.

8. A light-amount adjusting device according to claim 5, wherein the control circuit drives the stepping motor further in a same direction for a predetermined number of steps after causing the part of the light-amount adjusting member to come into abutment with the mechanical abutment portion at the time when the initial reset is performed.

9. A camera that is provided with the light-amount adjusting device according to claim 5, wherein the control circuit adapted to stop the light-amount adjusting member to the position nearer a minimum aperture side than an intermediate position within a driving range where the light-amount adjusting member acts to adjust light-amount at a time when a mode switching of the camera is performed.

10. A camera according to claim 9, wherein the time when the mode switching of the camera is performed comprises at least one of a time when switching is performed from a camera photographing mode to a camera image reproduction mode and a time when switching is performed from an optical finder using mode to an electrical finder using mode.

11. A driving method for a member to be driven, comprising:
setting a driving range of the member to be driven;
bringing a portion of the member to be driven into abutment with a mechanical abutment portion at a time when an initial reset of the stepping motor is performed; and
stopping the member to be driven to a position nearer one end portion of a driving range in which the driving device effects predetermined operation, than an intermediate position in the driving range at a time when a power source for the driving device is turned OFF, which is followed by the initial reset that is performed for a next drive.

12. A method of effecting light amount adjustment, comprising:
setting a driving range of a light-amount adjusting member that causes the light-amount adjusting member to open and close via a drive force transmitting portion so as to adjust an amount of light passing through an optical system;
bringing a portion of the light-amount adjusting member into abutment with a mechanical abutment portion at a time when an initial reset of the stepping motor is performed, the mechanical abutment portion being provided at a position outside the driving range; and
stopping the light-amount adjusting member to a position nearer a minimum aperture side than an intermediate position within a driving range where the light-amount adjusting member acts to adjusting light-amount at a time when a power source of the light-amount adjusting member is turned OFF.

* * * * *